United States Patent [19]

Yamato et al.

[11] Patent Number: 4,878,163
[45] Date of Patent: Oct. 31, 1989

[54] PULSE WIDTH MODULATED INVERTER WITH HIGH-TO-LOW FREQUENCY OUTPUT CONVERTER

[75] Inventors: Ikuo Yamato; Norikazu Tokunaga; Yasuo Matsuda; Hisao Amano, all of Hitachi, Japan

[73] Assignee: Hitachi, Ltd., Tokyo, Japan

[21] Appl. No.: 201,755

[22] Filed: Jun. 3, 1988

[30] Foreign Application Priority Data

Jun. 5, 1987 [JP] Japan .................................. 62-139800
Jun. 5, 1987 [JP] Japan .................................. 62-139801

[51] Int. Cl.⁴ .............................................. H02M 5/27
[52] U.S. Cl. ........................................... 363/8; 363/41; 363/160
[58] Field of Search ................. 363/8, 41, 79, 160, 363/162

[56] References Cited

U.S. PATENT DOCUMENTS 4,479,175 10/1984 Gille et al. .............................. 363/41
4,706,178 11/1987 Hayashi ................................. 363/41

FOREIGN PATENT DOCUMENTS 2629407  1/1978  Fed. Rep. of Germany .......... 363/8
28577    2/1982  Japan .................................. 363/41
236371  10/1986  Japan .
293170  12/1986  Japan .

Primary Examiner—William H. Beha, Jr
Attorney, Agent, or Firm—Antonelli, Terry & Wands

[57] ABSTRACT

In a power conversion system, a DC voltage of a DC power supply is converted into a predetermined high-frequency voltage by an inverter, and a high-frequency low voltage generated from the inverter is converted into a high-frequency high voltage by a transformer. A high-frequency high voltage generated from a secondary winding of the transformer is converted into a predetermined low-frequency voltage by a frequency changing circuit. The commutating operation of the frequency changing circuit is performed by a control circuit in response to the output current of the frequency changing circuit and in synchronism with the starting time of the short-circuiting prevention period of the inverter. As a result, the converted output of the power conversion system is prevented from decreasing.

6 Claims, 13 Drawing Sheets

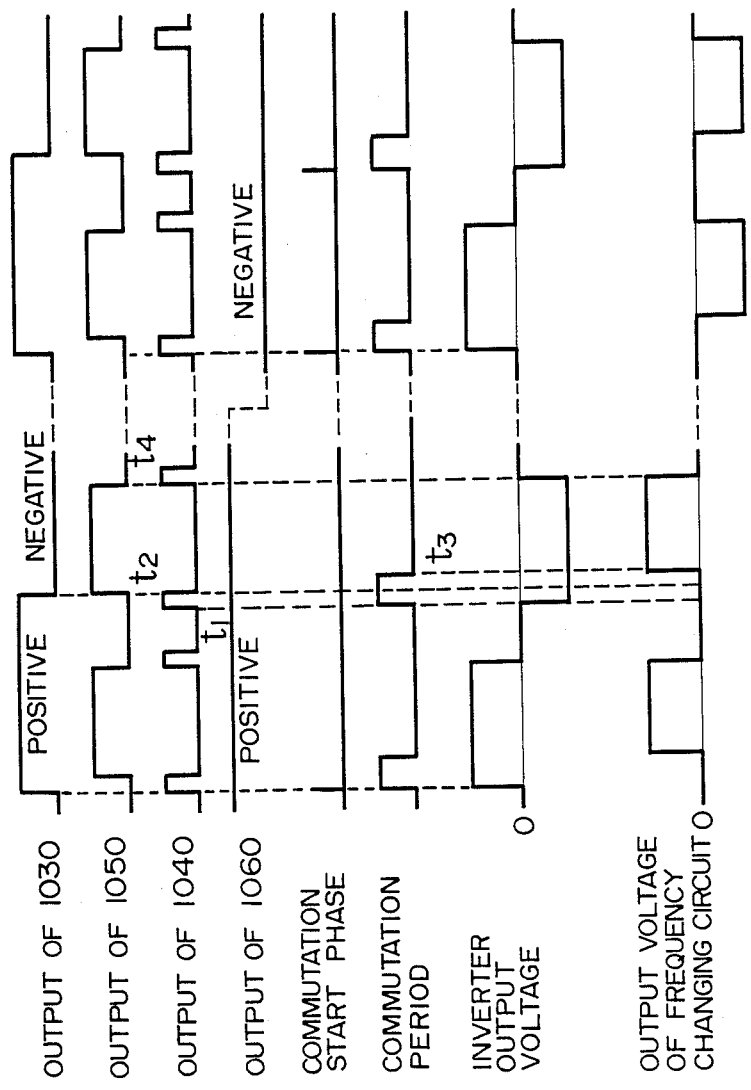

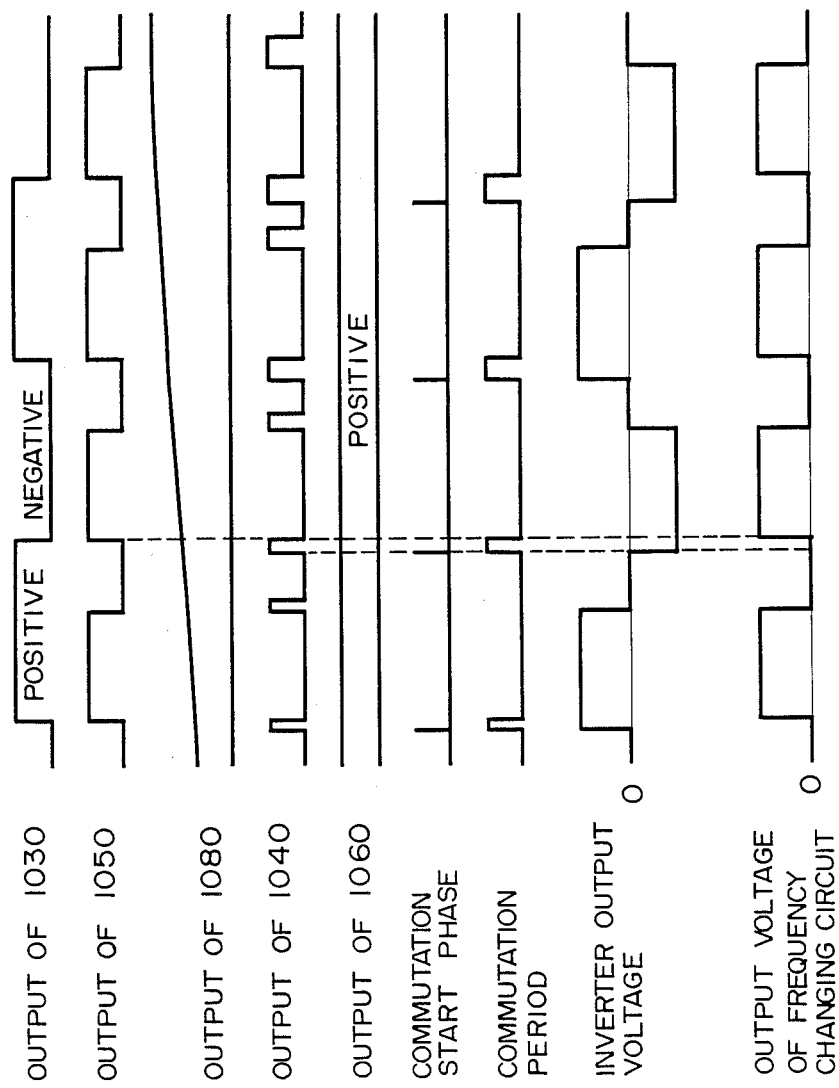

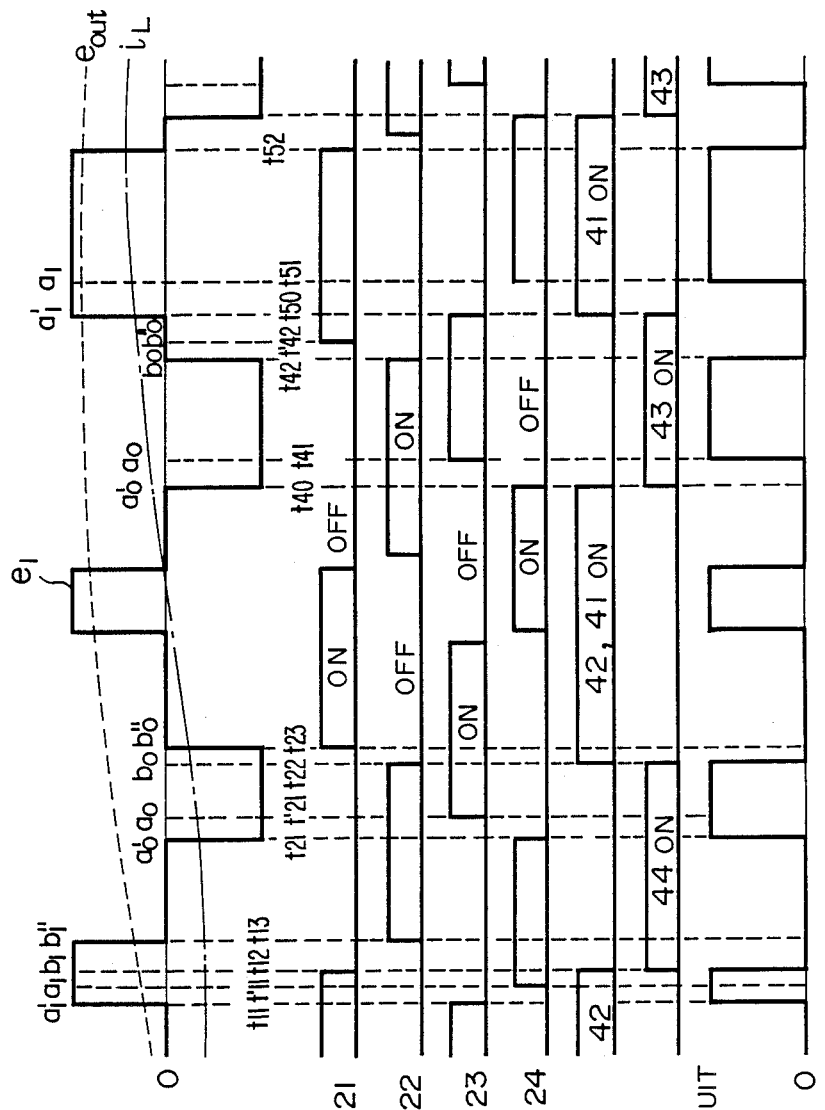

PULSE WIDTH MODULATED INVERTER WITH HIGH-TO-LOW FREQUENCY OUTPUT CONVERTER

BACKGROUND OF THE INVENTION

This invention relates to a power conversion system which is used, for example, for an interruptable power supply.

In a conventional power conversion system comprising an inverter for forming an alternating current from a direct current, high frequencies are used for reduced size and improved performance.

A power conversion system in which a high-frequency voltage generated in an inverter is applied through a transformer and converted into a low-frequency voltage at a frequency changing circuit to reduce the size and improve the performance is disclosed, for example, in JP-A-61-236371 and JP-A-61-293170.

FIG. 1 shows an example of a conventional power conversion system. In FIG. 1, reference numeral 1 designates a DC power supply, numeral 2 an inverter including gate turn-off thyristors (hereinafter referred to as GTO) 21, 22, 23, 24 and diodes 25, 26, 27, 28, numeral 3 a transformer, and numeral 4 a frequency changing circuit including a bilateral switching circuit 401 having GTO 41, 42 and a bilateral switching circuit 402 having GTO 43, 44. The switching circuits 401 and 402 include a center tap connection. Numerals 15 and 16 designate a reactor and a capacitor respectively of a filter 5 for improving the waveform of the output voltage of the frequency changing circuit 4, and numeral 7 a current detector. Numeral 100 designates a control circuit including control signal forming circuits 101 and 102 for forming a control signal applied to the GTO 21, 22, 23, 24 of the inverter 2 and the GTO 41, 42, 43, 44 of the frequency change circuit 4, a polarity signal forming circuit 103 for forming a polarity signal of an output voltage of the inverter 2, a voltage width determining circuit for determining the time width of the output voltage of the inverter 2, a short-circuiting prevention period generation circuit 104 for generating a short-circuiting prevention period signal for the inverter 2, a voltage polarity determining circuit 106 for determining the polarity of an output voltage of the frequency changing circuit 4, and a current polarity discrimination circuit for discriminating the polarity of the output current of the frequency changing circuit 4.

The operation of the above-mentioned conventional system will be described with reference to FIG. 2. The GTO 21, 22, 23, 24 of the inverter 2 are turned on and off in a manner to produce a voltage determined by the voltage width determining circuit 105, and short-circuiting prevention periods $t_1$ to $t_2$ and $t_4$ to $t_5$ are inserted to prevent the short-circuiting of the DC power supply 1. The frequency changing circuit 4, on the other hand, selects a switching element which is conducted in accordance with an output of the polarity signal forming circuit 103 for forming a polarity signal the output of the inverter 2 and the outputs of the voltage polarity determining circuit 106 and the current polarity discrimination circuit 107 for forming a polarity signal of the output voltage and output current of the frequency changing circuit 4 respectively thereby to convert a high-frequency voltage formed in the inverter 2 into a low-frequency voltage.

In the aforementioned prior art system, the starting time of the commutating operation for switching the switching element of the frequency changing circuit is set to coincide with the end time $t_2$ of the short-circuiting prevention period of the inverter as shown in FIG. 2. During the short-circuiting prevention period $t_1$ to $t_2$, however, a current path is formed from the transformer to the DC power supply, and therefore a voltage is produced at the output of the inverter, which in turn appears as an unnecessary reverse voltage at the output of the frequency changing circuit. As a result, the voltage which otherwise could be produced during the output period $t_2$ to $t_4$ is thus reduced during the commutation period $t_2$ to $t_3$ and the short-circuiting prevention period $t_1$ to $t_2$, thereby posing the problem of a reduced output voltage of the power conversion system.

Further, the commutation operation, though possible during the period when the polarity of the output voltage coincides with that of the current flowing in the reactor 5, cannot be effected and therefore an interrupting operation is required during the period when the polarity of the output voltage is different from that of the reactor current.

SUMMARY OF THE INVENTION

The object of the present invention is to provide a power conversion system in which, during the period of the output voltage, a frequency changing circuit is switched on by using an inverter voltage and commutated in synchronization with a starting time of a short-circuiting prevention period of the inverter the voltage produced during the short-circuiting prevention period is prevented from appearing at the output of the frequency changing circuit, and thus the output voltage is prevented from decreasing.

In order to achieve the above-mentioned object, there is provided according to the present invention a power conversion system comprising a control circuit for controlling the on and off timings of a switching element of a frequency changing circuit and an inverter in accordance with the polarity of the output voltage, output current and the magnitude of the output current of the frequency changing circuit.

During the commutation period of the frequency changing circuit, the output voltage becomes zero, and therefore as long as the polarity of the output voltage coincides with that of the output current, the on-timing of the switching device of the frequency changing circuit is set to coincide with the starting time of the short-circuiting prevention period of the inverter. By doing so, the short-circuiting prevention period overlaps the commutation period so that the unnecessary voltage generated during the short-circuiting prevention period is not produced as a reverse voltage, thus dampening the reduction in the output voltage. During the period when the output voltage is different in polarity from the output current, the unnecessary voltage generated during the short-circuiting prevention period is not produced as a reverse voltage, and therefore the output voltage reduction is dampened.

BRIEF DESCRIPTION OF THE DRAWINGS

The above and other objects, features and advantages will be made apparent by the detailed description taken in conjunction with the accompanying drawings in which:

FIG. 5 is a diagram showing waveforms produced from main circuits useful for operation of the power conversion system shown in FIG. 3;

FIG. 6 is a diagram showing waveforms produced by main circuits useful for operation of the power conversion system according to a second embodiment of the present invention;

FIGS. 10A, 10B, 10C and 10D are timing charts useful for explaining the operation of the system of FIG. 8 in detail;

DESCRIPTION OF THE PREFERRED EMBODIMENTS

Figure 1:
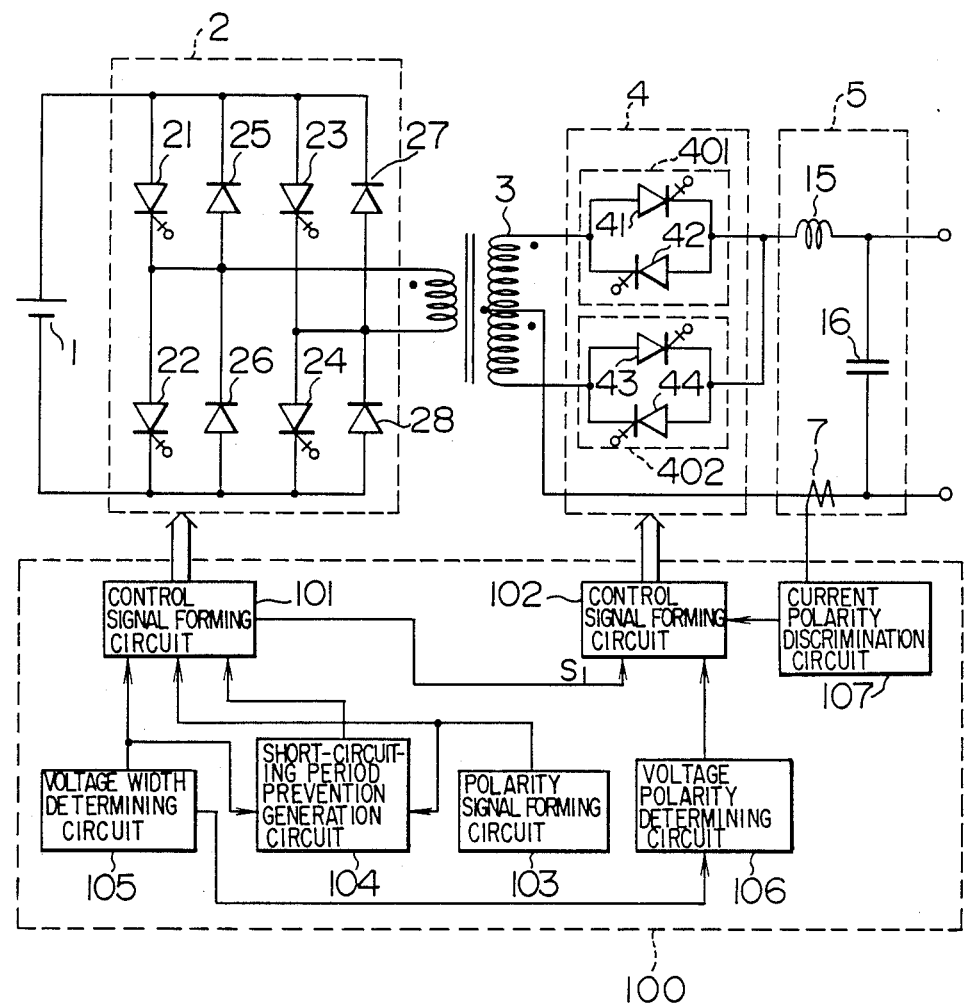
FIG. 1 shows a circuit configuration of a conventional power conversion system.
Figure 2:
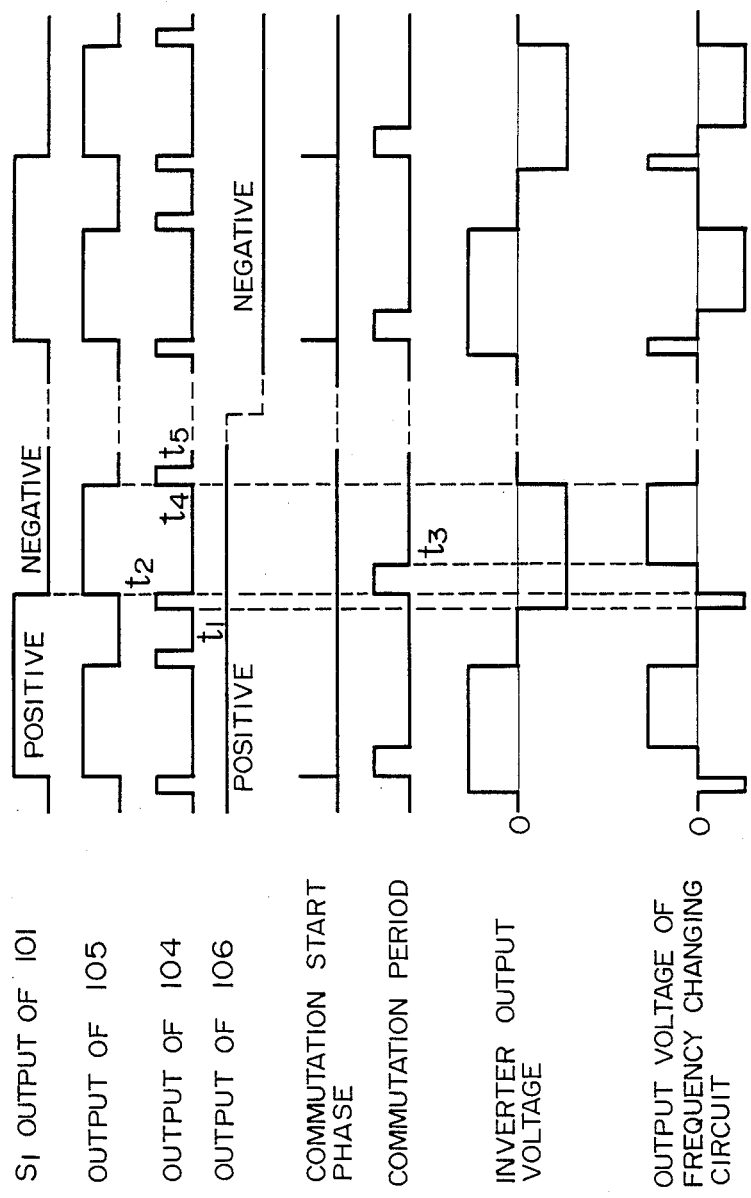
FIG. 2 shows waveforms produced from main circuits useful for operation of the power conversion system shown in FIG. 1.
Figure 3:
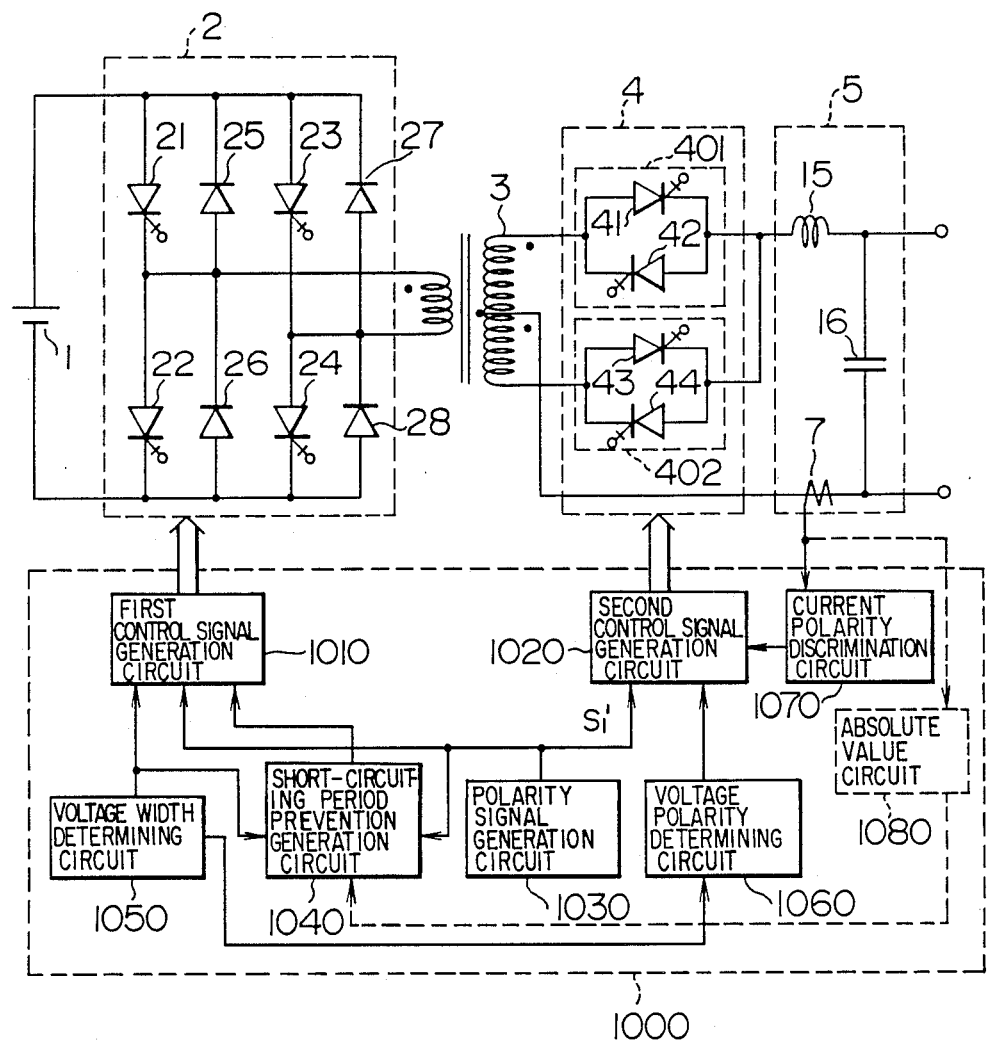
FIG. 3 is a diagram showing a circuit configuration of a power conversion system according to a first embodiment of the present invention.

A first embodiment of the present invention will be described with reference to FIG. 3. In FIG. 3, those parts which are identical to the parts used in the conventional power conversion system are designated by the same reference numerals as corresponding parts in FIG. 1 respectively and will not be described.

Figure 4A:
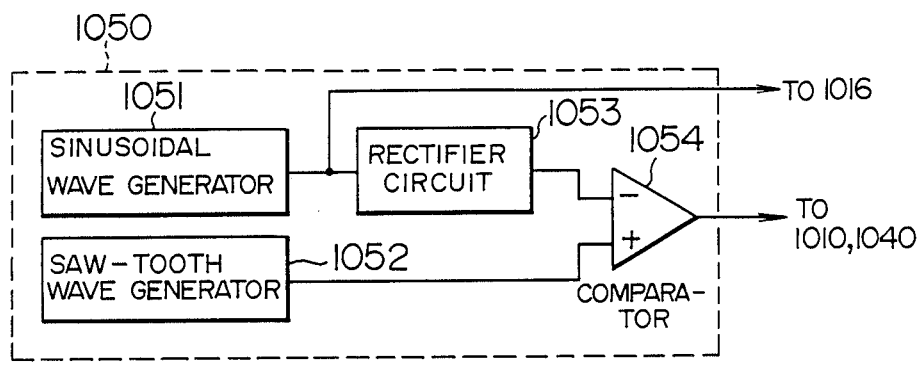
FIGS. 4A to 4F show configurations of the respective blocks of the control circuit included in FIG. 3.

In the first embodiment of the invention, a control circuit 1000 includes a voltage width determining circuit 1050, a short-circuiting prevention period generation circuit 1040, a polarity signal generation circuit 1030, first and second control signal generation circuits 1010, 1020, a voltage polarity determining circuit 1060, and a current polarity discrimination circuit 1070. The voltage width determining circuit 1050 for determining the time width of the output voltage of the inverter 2, as shown in FIG. 4A, includes a sinusoidal wave generator 1051, a saw-toothed wave generation circuit 1052, a rectification circuit 1053 and a comparator 1054. A sinusoidal wave signal generated from the sinusoidal wave generator 1051 is rectified through the rectification circuit 1053. The rectified signal from the rectification circuit 1053 is applied to the negative input of the comparator 1054, and the saw-toothed wave signal from the saw-toothed wave generation circuit 1052 is applied to the positive input of the comparator 1054 at the same time. The comparator 1054 compares the rectified sinusoidal wave signal with the saw-toothed wave signal and produces an output voltage width determining signal for determining the time duration of an output voltage of the inverter 2.

Figure 4B:
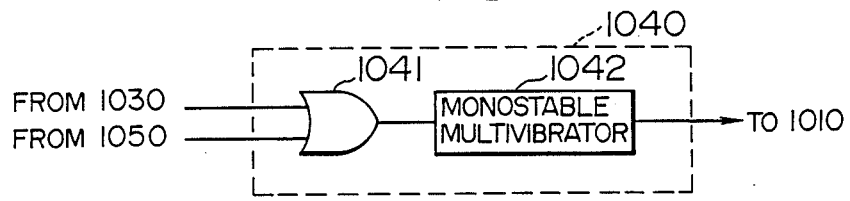

The short-circuiting prevention period generation circuit 1040 for generating a short-circuiting prevention period signal for the inverter 2, as shown in FIG. 4B, includes an OR circuit 1041 and a monostable multivibrator 1042. The OR circuit 1041 is supplied with signals from the polarity signal forming circuit 1030 for forming a polarity signal and the voltage width determining circuit 1050 for determining the time width of the output voltage of the inverter 2, and produces an OR signal, which triggers the monostable multivibrator 1042 to generate a short-circuiting prevention period signal having a predetermined time duration.

Figure 4C:
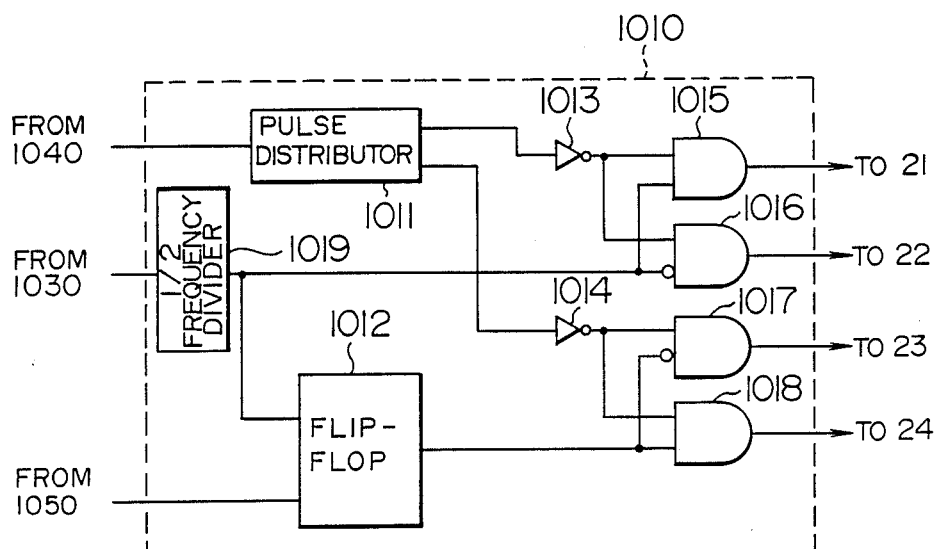

The first control signal generation circuit 1010 for applying a control signal to the GTO 21, 22, 23, 24 of the inverter 2, as shown in FIG. 4C, includes a pulse distributor 1011, a flip-flop 1012, a buffer circuits 1013, 1014, AND circuits 1015, 1016, 1017, 1018 and a frequency dividing circuit 1019. The pulse distributor is supplied with a short-circuiting prevention period signal from the short-circuiting prevention period generation circuit 1040 and distributes it among AND circuits 1015, 1016, 1017 and 1018 at one input terminal through buffer circuits 1013 and 1014. The flip-flop circuit 1012 is supplied with a polarity signal from the polarity signal forming circuit 1030 through the frequency dividing circuit 1019 at the data input, and a voltage width determining signal from the voltage width determining circuit 1050 at the clock input. An output signal of the flip-flop circuit 1012 is applied to the other input terminals of the AND circuits 1017 and 1018, and the polarity signal of the polarity signal forming circuit 1030 is applied through the frequency dividing circuit 1019 to the other input terminals of the AND circuits 1015 and 1016. The AND circuits 1015, 1016, 1017 and 1018 apply a control signal to the gates of the GTO 21, 22, 23 and 24.

Figure 4D:
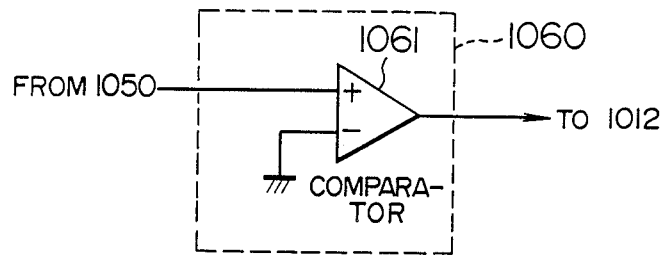

The voltage polarity determining circuit 1060 for determining the polarity of the output voltage of the frequency changing circuit 4, as shown in FIG. 4D, includes a comparator 1061. The positive input terminal of the comparator 1061 receives the voltage width determining signal from the voltage width determining circuit which signal is compared with the earth potential to generate a voltage polarity determining signal.

Figure 4E:
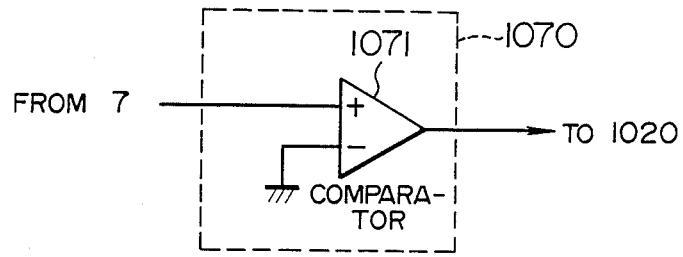

The current polarity discrimination circuit 1070 for discriminating the polarity of the output current of the frequency changing circuit 4, as shown in FIG. 4E, includes a comparator 1071. The positive input terminal of the comparator 1071 receives a current detection signal from the current detector 7, which detection signal is compared with the earth potential thereby to generate a current polarity discrimination signal. The current detector 7 includes a current transformer (CT) in this invention.

Figure 4F:
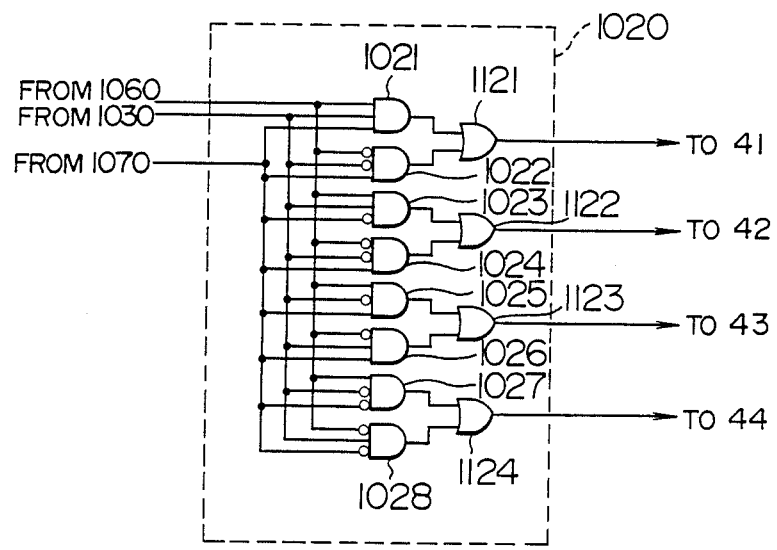

The second control signal generation circuit 1020 for applying a control signal to the gates of the GTO 41, 42 and GTO 43, 44 of the frequency changing circuit 4, as shown in FIG. 4F, includes AND circuits 1021, 1022, 1023, 1024, 1025, 1026, 1027 and 1028 and OR circuits 1121, 1122, 1123 and 1124. The first inputs of the AND circuits 1021 to 1028 receive a polarity signal from the polarity signal generation circuit (including an oscillation circuit) 1030 for generating a polarity signal for the output voltage of the frequency changing circuit 4, and the second input terminals of the respective AND circuits receive a voltage polarity determining signal from the voltage polarity determining circuit 1060. Further, the third input terminals of the respective AND circuits receive a current polarity discrimination signal from the current polarity discrimination circuit. The OR circuit 1121, supplied with an AND signal from the AND circuits 1021 and 1022, applies a control signal to the GTO 41. The OR circuit 1122, supplied with an AND signal from the AND circuits 1023 and 1024, applies a control signal to the GTO 42. The OR circuit 1123 is supplied with an AND signal from the AND circuits 1025 and 1026, and applies a control signal to the GTO 43. The OR circuit 1124 supplied with an AND signal from the AND circuits 1027 and 1028 applies a control signal to the GTO 44.

The operation of the first embodiment of the present invention will be explained with reference to FIG. 5. The frequency changing circuit 4 selects a switching element conducted in accordance with the polarity signal for the output voltage of the inverter 2, a polarity signal for the output voltage of the frequency changing circuit 4 and a polarity signal for the output current of the circuit 4, and the starting time of the commutating operation is controlled to the starting time $t_1$ of the short-circuiting prevention period. As a result, the short-circuiting prevention period $t_1$ to $t_2$ is overlapped with at least a part of the commutation period $t_1$ to $t_3$, and therefore the voltage applied to the inverter during the short-circuiting prevention period $t_1$ to $t_2$ contains less unnecessary reverse voltage. As a consequence, the reduction of the output voltage of the frequency changing circuit 4 is reduced only to the voltage associated with the period $t_2$ to $t_3$ providing the difference between the commutation period and the short-circuiting prevention period, and thus the reduction in the output voltage of the power conversion system is suppressed.

The operation of a second embodiment comprising an absolute value circuit 1080 shown by a dotted line in FIG. 3 will be described with reference to FIG. 6. The second embodiment is different from the first embodiment in that in the second embodiment, the time length of the shorting prevention period of the inverter 2 is controlled by an absolute value circuit 1080 in proportion to the absolute value of the output current of the frequency changing circuit 4. The absolute value circuit 1080 includes a rectification circuit. The commutation period of the frequency changing circuit 4 is substantially proportional to the absolute value of the output current of the frequency changing circuit, and therefore it is possible to superpose the short-circuiting prevention period on the commutation period during the period $t_1$ to $t_2$ by controlling the time length of the short-circuiting prevention period in a manner to be proportional to the absolute value of the output current. As a result, the frequency changing circuit 4 is capable of producing a voltage during the period $t_2$ to $t_4$, as should be originally produced, thus making it possible to reduce to zero the reduction in the output voltage of the power conversion system which otherwise might be caused by the absence of output voltage during the commutation period as well as the voltage generated during the short-circuiting prevention period.

Figure 7:
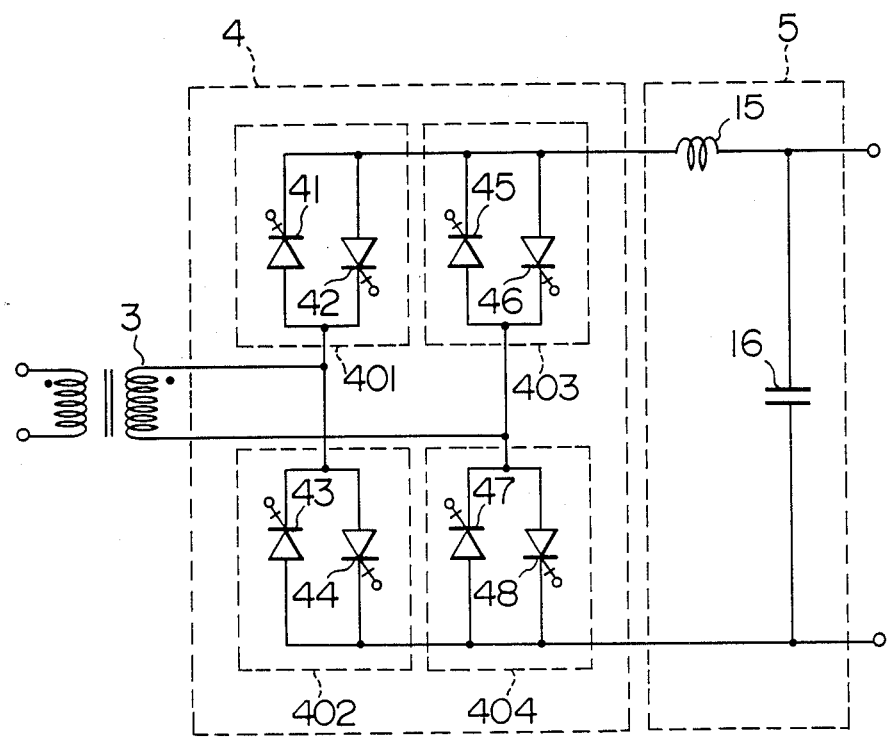
FIG. 7 shows a configuration of a frequency changing circuit of a power conversion system according to a third embodiment of the present invention.

FIG. 7 shows a third embodiment of the system according to the present invention. In the third embodiment, the frequency changing circuit 4 in the first and second embodiments comprises four switching circuits 401, 402, 403 and 404 connected in bridge connection. The third embodiment operates the same way and has the same effect as the first and second embodiments.

In the aforementioned embodiments, the GTO 21, 22, 23, 24 and GTO 41, 42, 43, 44, 45, 46, 47, 48 are used as switching elements, which may alternatively be self-quenching elements such as transistors or MOSFETs having an interrupting ability. Also, the GTO 41, 42, 43, 44, 45, 46, 47, 48 as the switching elements of the frequency changing circuit 4 may be replaced by other elements having no interrupting ability. Further, the embodiment under consideration, which has been described as a single-phase circuit, may be applied to three-phase and other multiple-phase circuits with equal effect.

Figure 8:
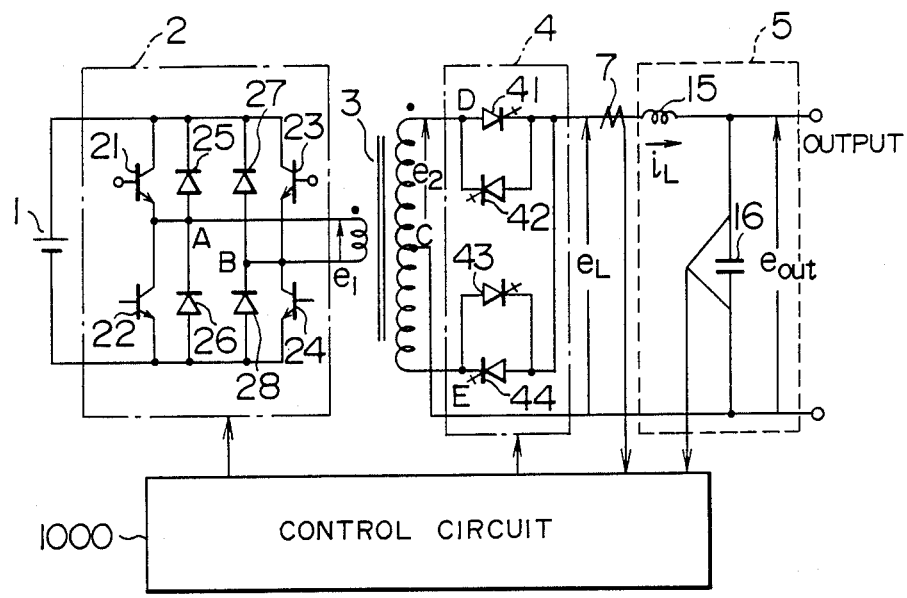
FIG. 8 shows a configuration of a power conversion system according to a fourth embodiment of the present invention.
Figure 9A:
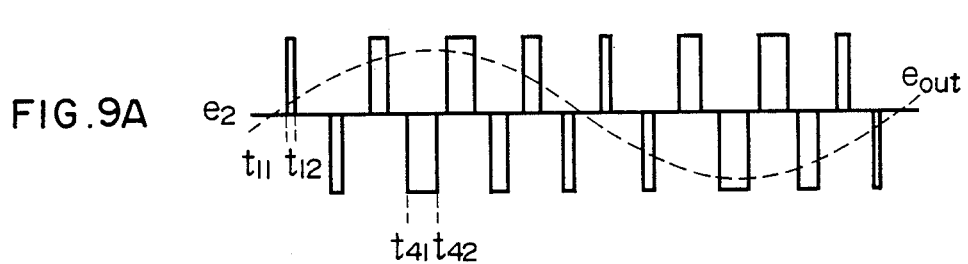
FIGS. 9A, 9B and 9C are diagrams showing waveforms useful for explaining the operation of general operation of the system shown in FIG. 8.
Figure 9B:
Figure 9C:

A fourth embodiment of the present invention is shown in FIG. 8, and the circuit operation is briefly explained with reference to FIG. 9. The inverter 2 forms an AC voltage $e_1$ indicated by solid line which is pulse-width modulated into a sinusoidal waveform $e_{out}$ defined by dotted line in FIG. 9A, and a voltage $e_2$ is generated across the secondary winding of the transformer 3. The frequency changing circuit 4, in order to form an output voltage $e_{out}$ shown by the dotted line from the AC voltage $e_2$ shown in FIG. 9A, controls the on/off operation of the switching elements 41, 42, 43, 44 to the polarity of the output voltage $e_{out}$ shown in FIG. 9B, thereby forming an output voltage $e_L$ of the frequency changing circuit shown in FIG. 9C. A filter 5 including a reactor 15 and a capacitor 16 produces a sinusoidal wave output voltage $e_{out}$ from the output voltage $e_L$.

The operation of the inverter 2 and the frequency changing circuit 4 will be described in detail. The output of the frequency changing circuit 4 is connected with a load through a waveform improving filter 5 including a reactor 15 and a capacitor 16. Depending on the magnitude of the load and the load power factor the phase of the current $i_L$ flowing in the reactor 15 against the output voltage $e_{out}$ is determined. During a single cycle of the output voltage $e'_{out}$ therefore, the output voltage $e_{out}$ may not be in phase with the current $i_L$ in one section while they have the same polarity in another section. FIG. 10 shows the operation of the inverter 2 and the frequency changing circuit 4 during different sections of a cycle of the output voltage $e_{out}$ when the output voltage $e_{out}$ has the same polarity as and is different in polarity from the current $i_L$, respectively. The operation during the section when the polarity of the output voltage $e_{out}$ is identical to that of the current $i_L$ will be explained. The period $t_{41}$ to $t_{42}$ indicates the time width of the pulse required for the output of the frequency changing circuit 4 to obtain an output voltage $e_{out}$ in the same period. The switching element 24 of the inverter 2 is turned off at the time point $t_{40}$. At the same time, a signal for turning on the switching element 43 of the frequency changing circuit 4 is applied. By the time point $t_{40}$, the current $i_L$ is positive and the element 41 turned on, so that the current is flowing from point C toward point D in the secondary winding of the transformer. Thus a current is flowing from point A toward point B in the transformer primary. As a result, a current in opposite polarity flows in the power supply 1 through the diodes 26, 27 connected in parallel in opposite polarity to the elements 22 and 23, and a voltage of a polarity shown in FIG. 10A is applied to the primary winding of the transformer. Since a signal for turning on the element 43 is applied, a short-circuiting current begins increasing at a change rate determined by the leakage inductance value of the transformer 3 and the voltage across the power supply 1 through a short-circuiting circuit formed through the elements 43 and 41 in the secondary of the transformer, thus starting the commutation from the element 41 to 43. In the process, the secondary circuit of the transformer is short-circuited, and therefore the voltage $e_L$ is 0. At the time $t_{41}$, the element 23 is turned on. Upon completion of the commutating operation from the element 41 to 43 at the time $t_{41}$ when the current in the element 41 becomes zero, the voltage shown in FIG. 10D is produced at the output $e_L$. The device 22 is turned off at the time $t_{42}$. The current then flows from point C toward E in the secondary winding of the transformer, and therefore a current in the primary winding flows from point B toward point A. In the inverter 2, a current flows through the diode 25 connected in parallel to the element 21 in opposite polarity and the element 23, and therefore the voltage across the primary winding of the transformer becomes zero. The output voltage also becomes zero. Then, at the time $t'_{42}$, the element 21 is turned on, but the polarity of the current remains unchanged, so that an operation similar to that during the period $t_{42}$ to $t'_{42}$ is performed. At the time $t_{50}$, the element 23 of the inverter 2 is turned off and the element 41 of the frequency changing circuit 4 turned on, with the result that a signal is applied. Since a current opposite in polarity to the one at the time $t_{40}$ flows in the primary winding of the transformer, a positive voltage is applied from the inverter 2 to the transformer 3, thus starting the commutation from the element 43 to element 41. The commutation completes at the time $t_{51}$. As a result, as shown in FIG. 10D, during the period from the time $t_{51}$ to the time $t_{52}$ when the element 21 is turned off, the output voltage $e_L$ continues to be generated. Similar operation is performed subsequently.

The time length required for commutating operation from the element 41 to 43 and from the element 43 to 41 is determined by the voltage value of the power supply 1, the leakage inductance of the transformer 3 and the associated value of the current $i_L$. These values are used to determine the periods from the time $t_{40}$ to $t_{41}$ and from the time $t_{50}$ to $t_{51}$. At the same time, the inverter 2 and the frequency changing circuit 4 are actuated at the time $t_{40}$ and $t_{50}$ in the abovementioned timings respectively before the time $t_{41}$ and $t_{51}$ at which the output voltage $e_L$ should otherwise have been produced, thereby producing an output not affected by the commutating operation.

The operation during the period when the polarity of the output voltage $e_L$ is different from that of the output voltage will be explained. During this period, when the inverter 2 and the frequency changing circuit 4 are actuated in the above-mentioned timings, the switching operation of the switching element of the frequency changing circuit 4 cannot be performed by use of the voltage $e_1$ applied to the transformer 3.

The period from the time $t_{11}$ to $t_{12}$ represents the time width of the voltage pulse required for the output of the frequency changing circuit to produce an output voltage $e_{out}$. At the time point $t'_{11}$, the elements 21, 24 are on, with the voltage $e_1$ positive as shown. The current $i_L$ is negative and therefore a current is flowing from the point D toward the point C through the element 42 in the secondary winding of the transformer. At the time $t_{12}$, a voltage for turning on the element 44 is applied. Since the elements 21, 24 are on, a voltage of the same polarity as during the period from the time $t_{11}$ to $t_{12}$ continues to flow without regard to the particular polarity. Since the element 44 is on, a short-circuiting current flows through the elements 42 and 44 of the frequency changing circuit 4 by the voltage $e_1$, and when the commutating operation starts with the current zero in the element 42 at the time $t_{13}$, the commutating operation is completed. At the time point $t_{13}$, a current flows from point E toward point C in the secondary winding of the transformer through the element 44, and in the primary current from the point A toward point B. A current flows in the inverter 2 through a diode 26 and a element 24 connected in parallel in opposite polarities to the element 22, and therefore the voltage $e_1$ becomes zero after time $t_{13}$, so that the voltage $e_L$, as shown, is reduced to zero after time point $t_{12}$. At the time point $t'_{13}$, the device 22 is turned on but the state of the voltage $e_L$ remains unchanged.

The switching operation of the switching element cannot be effected by use of the applied voltage $e_1$ to the transformer 3.

The period $t_{11}$ to $t_{12}$ represents the time width of the voltage pulse required for the output of the frequency changing circuit for producing an output voltage $t_{out}$ during the same period. At time point $t_{11}$, the element 21 is turned on, and the elements 22, 23 off. At this time, a current is flowing from point D toward point C via the element 42 in the secondary winding of the transformer. As a consequence, a current flows in the inverter 2 through a diodes 25, 28 and a power supply 1 in parallel and in opposite polarity to the elements 21 and 24, and therefore a voltage of the polarity shown in FIG. 10A is generated. Even when the element 24 is turned on at time $t'_{11}$, this condition remains unchanged. Then, a signal for turning on the element 44 is applied at the time $t_{12}$. A voltage of the same polarity as during the period $t_{11}$ to $t_{12}$ continues to be generated in the inverter 2 regardless of the polarity of the current since the elements 21 and 24 are on. Since the element 44 is turned on, on the other hand, a short-circuiting current flows in the frequency changing circuit 4 via the elements 42 and 44 by the voltage $e_1$, so that the commutating operation is started, and the commutating operation is completed at the time $t_{13}$ when the current in the element 42 is reduced to zero. At the time $t_{13}$, a current flows through the element 44 from point E toward point C in the secondary winding of the transformer, and from point A toward point B in the primary winding. A current flows through the diode 26 connected in parallel to the element 22 in opposite polarities in the inverter 2, and therefore the voltage $e_1$ is reduced to zero after the time $t_{13}$, with the result that the voltage $e_1$ becomes zero after time $t_{13}$ and the output voltage $e_L$ becomes zero after the time $t_{12}$ as shown. Thus the output voltage $e_L$ remains at zero after time $t_{12}$ as shown in the drawings. Although the element 22 is turned on at the time $t_{13}$ the voltage $e_L$ remains in the same condition.

At time $t_{21}$ when the element 24 is turned off, a current flows in the inverter 2 through a diode and a power supply in parallel in polarities opposite to the elements 22 and 23. As a result, a voltage of the polarity shown in FIG. 10A is applied to the transformer 3 through the power supply 1. Thus a voltage of the polarity shown in FIG. 10A is applied to the transformer 3, and the voltage shown in FIG. 10D is produced at the output of the frequency changing circuit 4. Even when the element 230 is turned on at the time $t'_{21}$, the voltage $e_L$ remains in the same state.

A signal for turning on the element 42 is applied at the time $t_{22}$ so that the commutating operation starts from the element 44 to the element 42. The associated operation is performed in the same manner as the commutating operation from the element 42 to element 44.

The time required for the commutation from the element 42 to element 44 or the other way is determined by the value of the voltage $e_L$, the voltage value of the power supply 1 and the leakage inductance of the transformer 3 as in the case where the polarity of the output voltage $e_L$ coincides with that of the current $i_L$. The periods from the time $t_{12}$ to $t_{13}$ and from the time $t_{22}$ to $t_{23}$ are determined by the values of the source voltage, leakage inductance and the voltage $e_L$, and by turning on the inverter 2 and the frequency changing circuit 4 in the above-mentioned timings in such a manner as to attain a period when the voltage $e_L$ should be produced, the commutating operation is made possible even during the period when the polarity of the output voltage $e_{out}$ is different from that of the output current $i_L$ while at the same time producing an output voltage free of being affected by the commutating operation.

Figure 11:
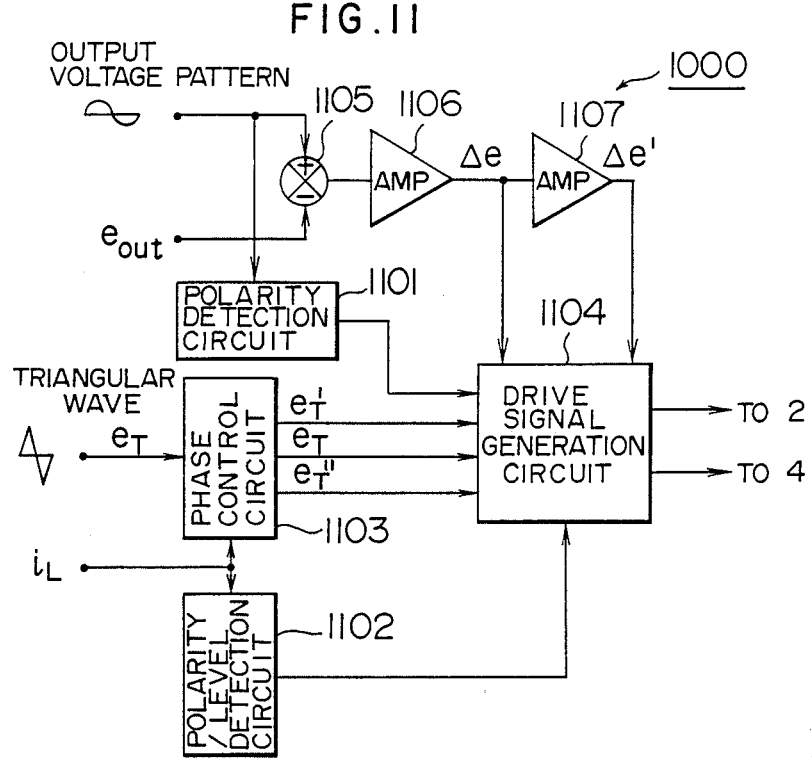
FIG. 11 shows a configuration of a control circuit of the power conversion system shown in FIG. 8.

A control circuit 1000 according to a fourth embodiment of the present invention is shown in FIG. 11.

Figure 12A:
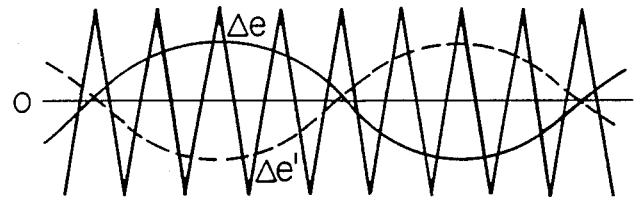
FIGS. 12A and 12B are diagrams showing waveforms useful for explaining the operation of the control circuit included in FIG. 11.
Figure 12B:
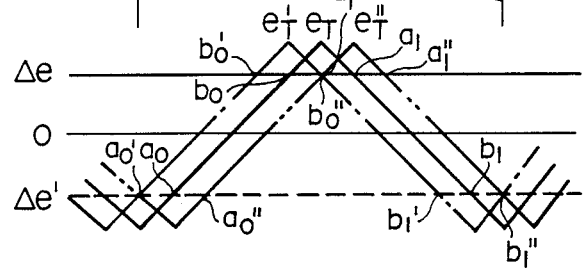

FIG. 12 shows waveforms for explaining the embodiment shown in FIG. 11. In FIG. 11, numeral 1101 designates a polarity detection circuit, numeral 1102 a polarity/level detection circuit, numeral 1103 a phase control circuit, numeral 1104 a drive signal forming circuit, numeral 1105 an adder/subtractor, and numerals 1106, 1107 amplifiers. The pattern of an output voltage compared with the output voltage $e_{out}$, so that an error voltage $\Delta e$ and an error voltage $\Delta'$ of a different polarity are formed. From the voltage pattern, the polarity of the voltage to be produced as $e_L$ is formed by the polarity detector 1101. The polarity and level are detected from the detection value of the current $i_L$ by the polarity/level detector 1102. Currents $e'_T$ and $e''_T$ with the phase thereof advanced or retarded by an amount corresponding to the value of the current $i_L$ are formed by the phase control circuit 1103 from the high-frequency reference triangular wave $e_T$ and the current $i_L$. Waveforms thus obtained are shown in FIG. 12A, and the enlarged forms are shown in FIG. 12B. The drive signal forming circuit 1104 forms signals representing the crossing time points $a_0'$, $a_0$, $a_0''$ and $b_0'$, $b_0$ and $b_0''$ of the triangular signals $e'_T$, $e_T$ and $e''_T$ and the error voltage signals $\Delta e$ and $\Delta e'$. Further, the polarity signals of these voltages and currents are used to select a signal for driving the the inverter 2 and switching element of the frequency changing circuit 4 from these signals, thus driving the switching element in the manner described in detail with reference to FIG. 10.

The level signal of the polarity/level detection circuit is used to apply a signal to the switching elements 42 and 41 of opposite polarities during the period when the polarity of the current $i_L$ undergoes a change as during the period from the time $t_{22}$ to $t_{40}$ shown in FIG. 10.

Figure 13A:
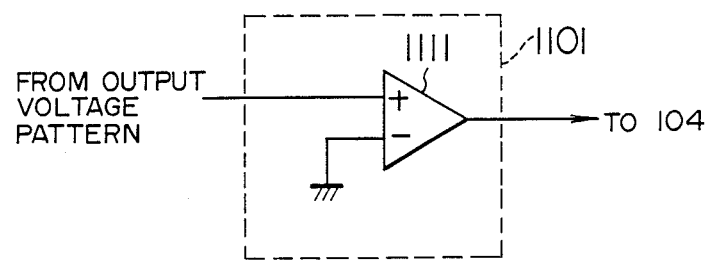
FIGS. 13A to 13D show configuration of the respective blocks of the control circuit shown in FIG. 11.
Figure 13B:
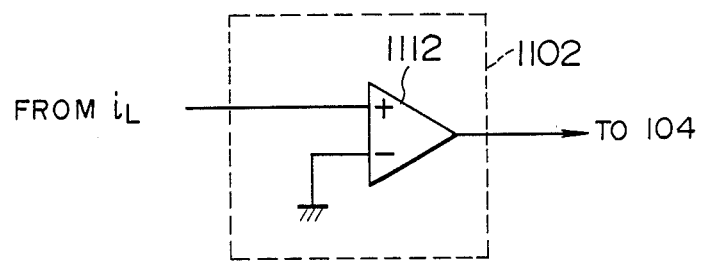

In the control circuit 1000 according to the fourth embodiment of the power conversion system of the invention, the polarity detection circuit 1101, as shown in FIG. 13A, includes a comparator 1111, the positive input of which is supplied with an output voltage pattern, which is compared with the earth potential thereby to produce a polarity detection signal. The polarity/level detection circuit 1102, as shown in FIG. 13B, includes a comparator 1112, which is supplied with a detection signal from the current detector 7 and compares it with the earth potential to produce a polarity/level signal.

Figure 13C:
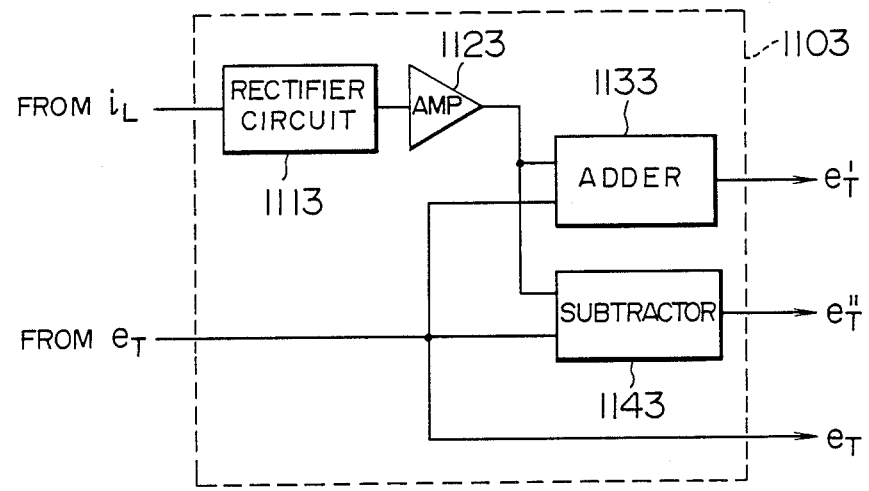

The phase control circuit 1103, as shown in FIG. 13C, includes a rectifier circuit 1113, an amplifier circuit 1123, an adder 1133 and a substractor 1143. The rectifier circuit 1113 is supplied with a detection signal $i_L$ from the current detector 7 and rectifies the detection signal, which is then amplified to a predetermined value by the amplifier 1123. The adder 1133 and the subtractor 1143 have each one input supplied with an amplification signal from the amplifier 1123, and the other input with a triangular wave signal $e_T$. The adder 33 adds the signal of the amplifier 1123 to the triangular wave signal $e_T$, and produces an advanced triangular wave signal $e'_T$ having a predetermined advanced phase. The subtractor 1143 subtracts the triangular wave signal $e_T$ from the signal of the amplifier 1123, and thus produces a retarded triangular wave signal $e''_T$ having a predetermined retarded phase.

Figure 13D:
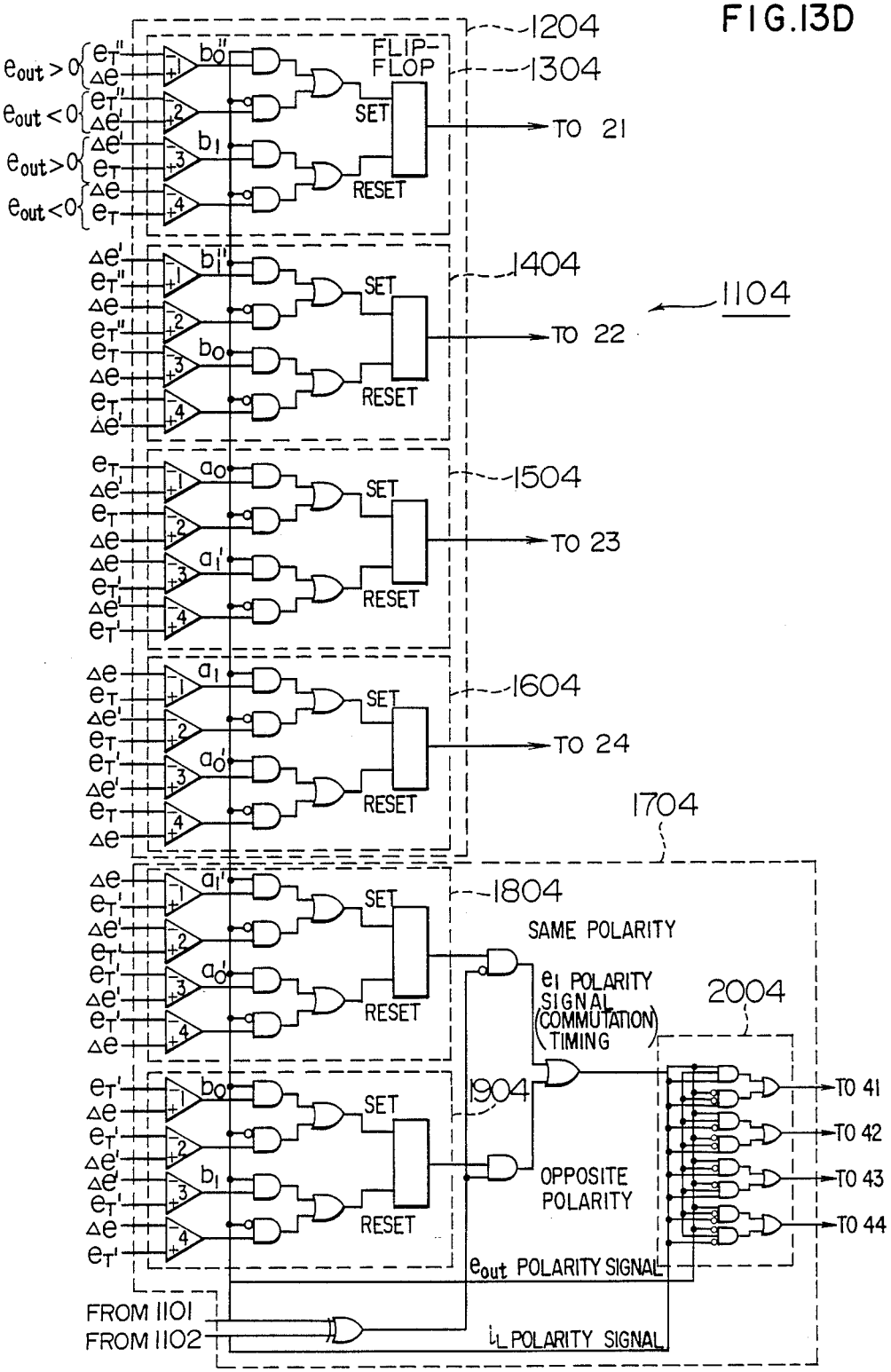

The drive signal generation circuit 1104, as shown in FIG. 13D, includes a first control signal generation circuit 1204 for generating a control signal to be applied to the inverter 2 and a second control signal generation circuit 1704 for generating a control signal to be applied to the frequency changer 4.

The first control signal generation circuit 1204 includes a first inverter control unit 1304 for generating control signal to be applied to the switching element 21 of the inverter 2, a second inverter control unit 1404 for generating a control signal to be applied to the switching element 22, a third inverter control unit 1504 for generating a control signal to be applied to the switching element 23, and a fourth inverter control unit 1604 for generating a control signal to be applied to the switching element 24.

The second control signal generation circuit 1704 includes a first converter control unit 1804, a second converter control unit 1904 and a third converter control unit 2040.

The first inverter control unit 1304 includes first, second, third and fourth comparators, first, second, third and fourth AND circuits, first and second OR circuits, and a flip-flop circuit. The second inverter control unit 1604, the third inverter control unit 1504, the fourth inverter control unit 1604, and the first converter control unit 1804 and the second converter control unit 1904 all include the same circuit components respectively as the first inverter control unit 1304. The third converter control unit 2004, includes the same circuit components as the second control signal generation circuit of the control circuit according to the first embodiment of the present invention.

The operation of the drive signal generation circuit 1104 will be described.

In the first inverter control unit 1304, the first comparator is supplied with a retarded triangular wave signal $e''_T$ from the phase control circuit 1103 and an error signal $\Delta e$ from the amplifier 1106 to detect a crossing time $b''_0$. The third comparator compares a reverse-polarity error voltage $\Delta e'$ from the amplifier 1107 with the triangular wave signal $e_T$ from the phase control circuit 1103 to detect a crossing time $b_1$.

In the second inverter control unit 1404, the first comparator compares the reverse-polarity error voltage $\Delta e'$ from the amplifier 1107 with the retarded triangular wave signal $e''_T$ from the phase control circuit 1103 to detect a crossing time $b''_1$. The third comparator compares the triangular wave signal $e_T$ from the phase control circuit 1103 with the error signal $\Delta e$ from the amplifier 1106 to detect a crossing time $b_0$.

In the third inverter control unit 1504, the first comparator compares the triangular wave signal $e_T$ from the phase control circuit 1103 with the reverse-polarity error voltage $\Delta e'$ from the amplifier 1107 to detect a crossing time $a_0$. The third comparator compares the error voltage $\Delta e$ from the amplifier 1107 with an advanced triangular wave signal $e'_T$ from the phase control circuit 1103 to detect a crossing time $a'_1$.

In the fourth inverter control unit 1604, the first comparator compares the error voltage $\Delta e$ from the amplifier 1106 with the triangular wave signal $e_T$ from the phase control circuit 1103 to detect a crossing time $a_1$. The third comparator compares the advanced triangular wave signal $e'_T$ from the phase control circuit 1103 with the reverse-polarity error voltage $\Delta e'$ from the amplifier 1107 to detect a crossing time $a'_0$.

In the first converter control unit 1804, the first comparator compares the error voltage $\Delta e$ from the amplifier 1106 with the advanced triangular wave signal $e'_T$ from the phase control circuit 1103 to detect a crossing time $a'_1$. The third comparator compares the advanced triangular wave signal $e'_T$ from the phase control circuit 1103 with the reverse-polarity error voltage $\Delta e'$ from the amplifier 1107 to detect a crossing time $a'_0$.

In the second converter unit 1904, the first comparator compares the advanced triangular signal $e'_T$ from the phase control circuit 1103 with the error voltage $\Delta e$ from the amplifier 1106 to detect a crossing time $b_0$. The third comparator compares the reverse-polarity error voltage $\Delta e'$ from the amplifier 1107 with the advanced triangular wave signal $e'_T$ from the phase control circuit 1103 to detect a crossing time $b_1$.

In the case where the output voltage $e_{out}$ is positive, the operation shown in FIG. 10B is obtained by turning on the switching element 22 during the period from the crossing time $b''_1$ to $b_0$, the switching element 23 from the crossing time $a_0$ to $a'_1$, and the switching element 24 from the crossing time $a_1$ to $a'_0$. For this purpose, the flip-flops of the inverter control units 1304, 1404, 1504 and 1604 are set at the crossing time $b''_0$, $b'_{1a_0}$ and $a_1$, and reset at the crossing time $b_1$, $b_0$, $a'_1$ and $a'_0$ respectively.

In the case where the output voltage $e_{out}$ is negative, the error voltages $\Delta e$ and $\Delta e'$ are reversed, and therefore the flip-flops and set or reset in opposite relations to the aforementioned case respectively.

In FIG. 10C, the switching elements 41, 42, 43 and 44 of the frequency changing circuit 4 are turned on by setting and resetting the flip-flops of the first converter control unit 1804 at the crossing time $a'_1$ and $a'_0$ when the output voltage $e_{out}$ has the same polarity as the output current $i_L$. The switching elements 41, 42, 43 and 44 are turned on by setting and resetting the flip-flops of the second converter control unit 1904 at the crossing time $b_0$, $b_1$ when the output voltage $e_{out}$ has a different polarity from the output current $i_L$.

We claim:

1. A power conversion system comprising:
    a DC power supply for supplying a predetermined DC voltage;
    an inverter including a plurality of switching elements connected in bridge connection and a plurality of diodes connected in parallel to the switching elements for converting the DC voltage of said DC power supply into a predetermined high-frequency AC voltage;
    a transformer including a primary winding supplied with the high-frequency AC voltage generated in said inverter and a secondary winding for generating a predetermined high-frequency high voltage;
    a frequency changing circuit connected to the secondary winding of said transformer and including a plurality of switching elements coupled in reverse parallel for converting the high-frequency high voltage generated in the secondary winding of said transformer into a predetermined low-frequency high voltage;
    a filter including a reactor and a capacitor for converting the low-frequency high voltage of said frequency changing circuit into a predetermined sinusoidal wave voltage;
    a detector for at least detecting the current flowing in the filter;
    first means for enabling a starting time of a short-circuiting prevention period of said inverter;
    second means for enabling a commutation period of said frequency changing circuit; and
    a control circuit means for generating a control signal and applying said control signal to said first and second means, said first and second means being responsive to said control signal for at least causing said commutation period of said frequency changing circuit to overlap said short-circuiting prevention period of said inverter.

2. A power conversion system according to claim 1, wherein said detector detects the current flowing in the reactor of said filter and the voltage generated across the capacitor of said filter.

3. A power conversion system comprising:
    a DC power supply for supplying a predetermined DC voltage;
    an inverter including a plurality of switching elements connected in bridge connection and a plurality of diodes connected in parallel to the switching elements for converting the DC voltage of said DC power supply into a predetermined high-frequency AC voltage;
    a transformer including a primary winding supplied with the high-frequency AC voltage generated in said inverter and a secondary winding for generating a predetermined high-frequency high voltage;
    a frequency changing circuit connected to the secondary winding of said transformer and including a plurality of switching elements coupled in reverse parallel for converting the high-frequency high voltage generated in the secondary winding of said transformer into a predetermined low-frequency high voltage;
    a filter including a reactor and a capacitor for converting the low-frequency high voltage of said frequency changing circuit into a predetermined sinusoidal wave voltage;
    a detector for at least detecting the current flowing in the reactor of said filter and the voltage generated across the capacitor of said filter; and
    a control circuit for applying to said inverter and said frequency changing circuit a control signal for initiating a commutation period of said frequency changing circuit in synchronism with a starting time of a short-circuiting prevention period of said inverter in response to the detection signal from the detector,
    wherein said control circuit includes:
    an error voltage generation circuit for comparing a detection voltage from said detector with an output voltage pattern and generating first and second error voltages;

a phase control circuit for generating first, second and third triangular wave signals having a predetermined phase in accordance with a detection current from said detector;

a polarity detection circuit for detecting a polarity of the detection voltage from said output voltage pattern;

a polarity/level detection circuit for detecting the polarity and level of the detection current of said detector; and a drive signal generation circuit for detecting the crossing time between the first and second error voltages from said error voltage generation circuit and the first, second and third triangular wave signals from said phase control circuit, and applying a control signal to the switching elements of said frequency changing circuit and said inverter in accordance with the detection signal from said polarity/level detection circuit.

4. A power conversion system comprising:

an inverter for converting a direction current into an alternating current;

a transformer including a primary winding connected to said inverter and including a secondary winding having a neutral terminal and two output terminals;

a plurality of switches connected in series between the two output terminals of said transformer, a junction point between said plurality of switches and the neutral terminal of said transformer respectively constituting output terminals of said power conversion system;

first means for enabling a starting time of a short-circuiting prevention period of said inverter;

second means for enabling a commutation period of said plurality of switches; and control circuit means for generating a control signal and applying said control signal to said first and second means, said first and second means being responsive to said control signal for at least causing said commutation period of said plurality of switches to overlap said short-circuiting prevention period of said inverter.

5. A power conversion system comprising:

a DC power supply for supplying a predetermined DC voltage;

an inverter including a plurality of switching elements connected in bridge connection and a plurality of diodes connected in parallel to the switching elements for converting the DC voltage of said DC power supply into a predetermined high-frequency AC voltage;

a transformer including a primary winding supplied with the high-frequency AC voltage generated in said inverter and a secondary winding for generating a predetermined high-frequency high voltage;

a frequency changing circuit connected to the secondary winding of said transformer and including a plurality of switching elements coupled in reverse parallel for converting the high-frequency high voltage generated in the necessary winding of said transformer into a predetermined low-frequency high voltage;

a filter including a reactor and a capacitor for converting the low-frequency high voltage of said frequency changing circuit into a predetermined sinusoidal wave voltage;

a detector for at least detecting a current flowing in the filter;

first means for enabling a starting time of a short-circuiting prevention period of said inverter;

second means for enabling a commutation period of said frequency changing circuit; and control circuit means for generating a control signal and applying said control signal to said first and second means, said first and second means being responsive to said control signal to cause said short-circuiting prevention period of said inverter to overlap at least a part of said commutation period of said frequency changing circuit.

6. A power conversion system according to claim 5, wherein said plurality of switching elements of said frequency changing circuit comprise bilateral switches connected in a bridge configuration to at least one end of said secondary winding of said transformer.

* * * * *